United States Patent [19]

Ito et al.

[11] Patent Number: 4,656,560

[45] Date of Patent: Apr. 7, 1987

[54] ORGANIC SEMICONDUCTOR ELECTROLYTE CAPACITOR AND PROCESS FOR PRODUCING THE SAME

[75] Inventors: Takato Ito; Akihiro Shimada; Kimio Uchiyama, all of Tokyo, Japan

[73] Assignee: Nippon Chemi-Con Corporation, Tokyo, Japan

[21] Appl. No.: 700,248

[22] Filed: Feb. 11, 1985

[30] Foreign Application Priority Data

Feb. 10, 1984 [JP] Japan ................... 59-23099
Aug. 11, 1984 [JP] Japan ................. 59-168627

[51] Int. Cl.$^4$ .............................................. H01G 9/00
[52] U.S. Cl. ................................... 361/433; 252/62.2
[58] Field of Search ..................... 361/433; 252/62.2; 29/570

[56] References Cited

U.S. PATENT DOCUMENTS 3,214,648 10/1965 Ross et al. ............................ 361/433
3,872,358 3/1975 Murakami et al. .................. 361/433

FOREIGN PATENT DOCUMENTS 1210317 10/1970 United Kingdom ................ 361/433

Primary Examiner—L. T. Hix
Assistant Examiner—Douglas S. Lee
Attorney, Agent, or Firm—Sughrue, Mion, Zinn, Macpeak & Seas

[57] ABSTRACT

An organic semiconductor electrolyte capacitor and a process for producing such a capacitor having improved loss and impedance characteristics and which can be produced using a simple apparatus and with reduced waste of expensive materials. A dielectric oxide film is formed on the surface of a metal anode, and a solid-electrolyte layer is formed on the dielectric oxide film. The electrolyte layer is made by melting and solidifying a mixture of an isopropylisoquinolinium tetracyanoquinodimethane complex salt and a lactone compound.

2 Claims, 4 Drawing Figures

ORGANIC SEMICONDUCTOR ELECTROLYTE CAPACITOR AND PROCESS FOR PRODUCING THE SAME

BACKGROUND OF THE INVENTION

The present invention relates to an organic semiconductor electrolyte capacitor and a process for producing the same. More particularly, the invention relates to an improved process for forming an electrolyte layer of an organic semiconductor.

Solid-electrolytic capacitors use an anode in a foil or block form made from a film-forming metal such as aluminum or tantalum. The anode is etched to increase its surface area or made porous by sintering a compact of fine particles. The anode surface is overlaid with a dielectric oxide film, which is further coated with an electrolyte layer connected to a conductive cathode extension.

The prior solid-electrolyte layer is conventionally formed of manganese dioxide. Manganese dioxide solid-electrolyte is formed on the dielectric oxide film by impregnating the anode with a manganese nitrate solution and pyrolyzing the manganese nitrate into manganese dioxide at about 300° C. Only a small amount of manganese dioxide is deposited by one cycle of this process, and in order to provide the necessary deposit thickness, up to about 10 cycles or more must be repeated. This is disadvantageous not only because an extremely complicated process is required but also because the dielectric oxide film is deteriorated by the heat or gases produced during the pyrolysis of the manganese nitrate solution.

A proposal has been made for replacing manganese dioxide by a semiconductive organic compound as the material of the electrolyte layer. Complex salts of 7, 7, 8, 8-tetracyanoquinodimethane (hereunder TCNQ) are currently known as organic electrolytes. The TCNQ complex salts are solid at room temperature and require special methods for depositing them on a capacitor element as the electrolyte. According to U.S. Pat. No. 3,214,648, the anode is dipped in a solution having a TCNQ complex salt dissolved in an organic solvent, and after recovering the anode from the solution, the organic solvent is evaporated to disperse the TCNQ complex into a layer forming on the anode surface. However, the solvent used in this method has a low concentration of TCNQ complex salt and, as in the case of the manganese dioxide layer, up to about cycles of impregnation are required to deposit an acceptable thickness of the TCNQ complex salt layer. Therefore, the problem of process complexity still remains in the technique proposed by U.S. Pat. No. 3,214,648.

Japanese Patent Publication No. 32303/1976 proposes depositing on the anode surface a dispersion comprising a polymer compound and fine particles of a TCNQ complex salt. However, as in the method shown in U.S. Pat. No. 3,214,648, the TCNQ complex salt is crystallized or dispersed in the crystalline state after evaporation of the solvent, and because of the incomplete contact between the complex salt and the dielectric oxide film on the anode (which has been etched to provide a complex and irregular surface profile), the desired electrostatic capacity is not obtainable between the anode and cathode.

Another method has recently been propsed for depositing a TCNQ complex salt on the anode. This method consists of first heating the complex salt alone to a temperature higher than its melting point, then dipping the anode in the resulting melt, and recovering and cooling the anode. According to this method, the TCNQ complex deposited on the anode has such a high concentration that the desired amount of the TCNQ complex salt can be deposited by a single cycle of impregnation. However, the TCNQ complex salts are vulnerable to heat and many of them substantially preclude the application of this method since they are decomposed upon a very short period of heating above their melting points. For example, if isopropyl-isoquinolinium TCNQ complex salt is heated above 200° C., it smokes before melting and decomposes to form an insulator. In order to avoid this problem, the impregnation step must be completed within a short time and followed by rapid cooling. However, such rapid treatments require a complex apparatus and are unable to achieve a high yield. A further problem is caused by the fact that after cooling, the TCNQ complex salt is crystallized and the resulting poor contact with the dielectric oxide film causes insufficient electrostatic capacitance.

SUMMARY OF THE INVENTION

The present invention has been accomplished in order to eliminate the above mentioned defects of the prior art techniques by enabling the melting and impregnation of an isopropyl-isoquinolinium TCNQ complex salt, with a view to providing a solid-electrolyte capacitor having improved characteristics.

According to the present invention, the step of impregnating the dielectric oxide film on the anode of a solid-electrolyte capacitor with a solid-electrolyte layer made of a TCNQ complex salt is not only simplified, but the efficiency of this step is increased and the solid-electrolyte capacitor is provided with improved characteristics.

The present invention is characterized by providing an organic semiconductor electrolyte made of a mixture of an isopropyl-isoquinolinium TCNQ complex salt with one or more lactone compounds, heating the mixture to a temperature lower than the melting point or decomposition point of the isopropyl-isoquinolinium TCNQ complex salt so as to obtain a melt, dipping a capacitor element, in the melt, recovering the capacitor element from the melt, and cooling the element so that the desired organic semiconductor electrolyte layer solidifies on the element. The mixture of TCNQ complex salt and one or more lactone compounds turns to liquid at a temperature lower than the melting point of the TCNQ complex salt since a mixture of substances has a lower melting point (or freezing point) than any of the individual substances. More specifically, the isopropyl-isoquinolinium TCNQ complex salt has a melting point since the TCNQ complex salt is a crystallinity substance. On the other hand, the mixture of an isopropyl-isoquinolinium TCNQ complex salt with one or more lactone compounds by heating and melting is amorphous and has not a melting point. However, the mixture has a so-called "glass transition point" which is lower than the melting point of the TCNQ complex salt.

DESCRIPTION OF THE PREFERRED EMBODIMENTS

Figure 1:
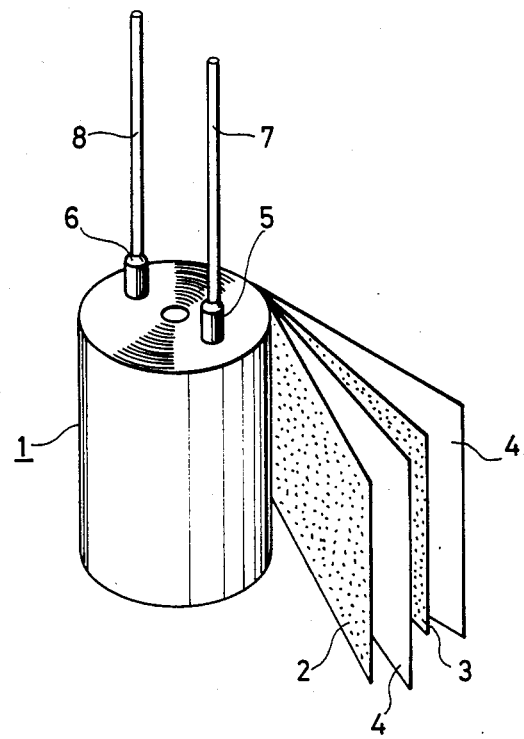
FIG. 1 is a perspective view of a capacitor element used in Examples described herein and which is partially unrolled to reveal its internal construction.

FIG. 1 illustrates the capacitor used in the Examples that follow of the present invention. The cylindrical capacitor element which is generally indicated at 1 is formed of a rolled electrode strip that is composed of an anode 2, a collector electrode 3 and a separator paper 4. The anode 2 is made of a high-purity aluminum foil which is etched to increase its surface area and which has a dielectric oxide film formed on its surface by anodization. The anode 2 is substantially coextensive with the collector electrode 3, and the two electrodes are superimposed on each other with the separator paper 4, which is slightly wider than the electrodes, inserted therebetween. Tabs 5 and 6 are connected by welding or other suitable means to the anode 2 and collector electrode 3, respectively. These tabs extend vertically from one end of the capacitor element so as to provide electrical connections to external circuits. External leads 7 and 8 are bonded to the tips of these tabs.

Figure 2:
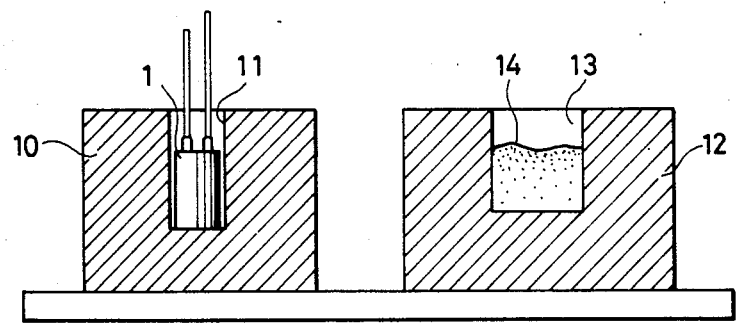
FIG. 2 is a cross section of an apparatus for impregnating the capacitor element with a solid electrolyte according to the present invention.

FIG. 2 illustrates how the organic semiconductor electrolyte layer is formed on the capacitor element 1. A preheating block 10 is shown on the left side of the Figure. This block has a heater embedded in its interior and has a recess 11 which is open to the top of the block. The capacitor element 1 is placed within this recess and heated to a predetermined temperature.

An impregnation block 12 is shown on the right side of the Figure. This block also has a heater embedded in its interior and a recess 13 in its top portion. This recess 13 is filled with a mixture 14 of a TCNQ complex salt and a lactone additive, and the mixture is heated until it melts. The capacitor element 1 that has been preheated in the block 10 is transferred into the recess 13 where it is dipped for a predetermined period until it is impregnated with the molten mixture of TCNQ complex salt and the lactone additive. The capacitor element 1 is then lifted above the recess 13 and left to cool, whereupon the molten mixture 14 is solidified to form an organic semiconductor electrolyte layer.

Figure 3:
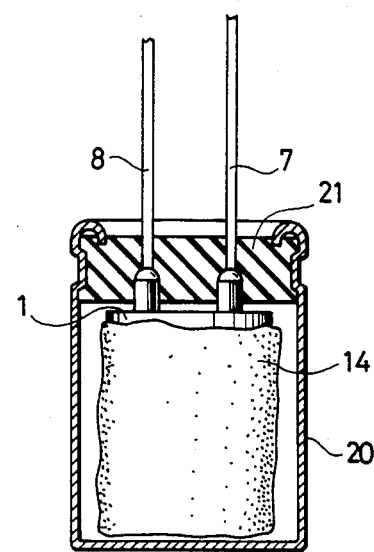
FIG. 3 is a cross section of capacitor according to the present invention.

The capacitor element 1 thus provided with the organic semiconductor electrolyte layer is encased in a bottomed tubular container 20 as shown in FIG. 3. The open end of the container is closed with an elastomeric plug 21 and the outer rim is curled to seal the case. The external leads 7 and 8 project outwardly through holes in the elastomeric plug 21 so as to provide electrical connections between the capacitor element 1 and an external circuit.

The advantages of the present invention will become more apparent from the following working examples and comparative examples.

COMPARATIVE EXAMPLE 1

A 99.99% pure aluminum anode strip (2.2 mm$^W$×10 mm$^L$×80 microns$^T$) was provided as a capacitor element. The anode was etched electrolytically with a.c. current to increase its surface area, and a dielectric oxide film having a breakdown voltage of 9 volts was formed on the etched surface by anodization. A 99.94% pure aluminum strip of substantially the same size as that of the anode was provided as a collector electrode. An aluminum tab was cold-welded to one peripheral edge of each strip approximately at its center. The two strips were then rolled about themselves with a separator paper blended with Manila hemp inserted between each strip. This capacitor element configuration was used in both Comparative Example 2 and the following working examples.

The thus-prepared cylindrical capacitor element was impregnated with a liquid electrolyte made of ethylene glycol and ammonium adipate. The impregnated element was encased in an aluminum container which was closed with a rubber stopper and sealed by curling the outer rim. The completed capacitor had voltage and capacitance ratings of 6.3 V and 10 microfarads, and the body had a diameter of 3 mm and a length of 5 mm. The capacitor was aged by applying the rated voltage for 15 minutes, and the resulting electrical characteristics were specified in the table.

COMPARATIVE EXAMPLE 2

The same capacitor element as that of the comparative Example 1 was preliminarily heated at 250° C. A composition solely made of an isopropyl-isoquinolinium TCNQ complex salt was placed in an impregnation block and heated to 240° C., at which temperature the composition turned to liquid.

The preheated capacitor element was quickly transferred to a position above the impregnation block, and all parts except for the top face from which the tabs projected were dipped in the molten TCNQ complex salt for 10 seconds. Then, the element was recovered from the melt and left to cool so as to solidify the isopropyl-isoquinolinium TCNQ complex salt.

The thus-treated capacitor element was encased in an aluminum container of the same size as used in Comparative Example 1, and sealed to provide a complete solid-electrolyte capacitor. The capacitor was aged by applying the rated voltage for one hour. The resulting electrical characteristics were specified in the table.

EXAMPLES 1 TO 13

Thirteen samples of the same capacitor elements as that of the comparative examples were preliminarily heated at 300° C. in the preheating blocks 10, respectively except that one part by weight of the isopropyl-isoquinolinium TCNQ complex salt was mixed with lactone compounds listed in the following table. The mixtures were heated and melted to the so-called glass transition points in the impregnation blocks 12, respectively. The preheated capacitor elements were dipped in the molten mixtures for 10 seconds, recovered therefrom, left to cool, respectively. Further, the same encasing, subsequent processing and aging as those of the comparative examples were performed. The characteristics of the completed capacitors of the examples 1 to 13 are specified in the following table.

TABLE

| Example No. | Additives | Electrolyte mixing ratio | Glass transition temp. (°C.) | Capacitance ($\mu F$) | dielectric loss (120 Hz) (tan $\delta$) | ESR (100 KHz) ($\Omega$) | Leakage current (2 min.) ($\mu A$) |
| --- | --- | --- | --- | --- | --- | --- | --- |
| Comparative Example 1 | liquid electrolyte | — | — | 9.2 | 0.30 | 25 | 0.10 |
| Comparative Example 2 | no additives | — | 240 (melting point) | 5.0 | 0.10 | 2.8 | 0.13 |
| Example 1 | γ-butyrolactone | 1:0.5 | 150 | 10.0 | 0.040 | 0.55 | 0.14 |
| Example 2 | γ-valerolactone | 1:0.3 | 200 | 9.1 | 0.065 | 1.0 | 0.22 |
| Example 3 | δ-valerolactone | 1:0.4 | 185 | 9.4 | 0.060 | 0.92 | 0.15 |
| Example 4 | ε-caprolactone | 1:0.3 | 200 | 9.0 | 0.055 | 0.91 | 0.25 |
| Example 5 | γ-heptalactone | 1:0.3 | 190 | 9.5 | 0.050 | 0.87 | 0.30 |
| Example 6 | δ-nonalactone | 1:0.3 | 200 | 9.3 | 0.045 | 0.59 | 0.20 |
| Example 7 | DL-pantoyllactone | 1:0.5 | 160 | 9.9 | 0.060 | 1.0 | 0.35 |
| Example 8 | γ-hexalactone | 1:5 | 150 | 8.9 | 0.042 | 0.9 | 0.35 |
| Example 9 | γ-octalactone | 1:10 | 120 | 9.2 | 0.053 | 1.3 | 0.01 |
| Example 10 | γ-nonalactone | 1:0.5 | 200 | 9.0 | 0.038 | 0.7 | 0.25 |
| Example 11 | γ-decalactone | 1:1 | 200 | 9.1 | 0.037 | 0.7 | 0.15 |
| Example 12 | γ-undecalactone | 1:1 | 180 | 8.9 | 0.039 | 1.0 | 0.24 |
| Example 13 | γ-dodecalactone | 1:0.3 | 180 | 8.8 | 0.039 | 0.8 | 0.31 |

Note 1: The figures in the column of "mixing ratio" show the proportions of lactone compounds against one part by weight of the isopropylisoquinolinium TCNQ complex salt.
Note 2: ESR stands for Equivalent Series Resistance.

As the above data shows, the electrolytic capacitor prepared in Comparative Example 1 had a high electrostatic capacity since the liquid electrolyte had intimate contact with the dielectric oxide film and penetrated to the deepest microscopic pits formed in the etched surface of the anode. However, the electrolyte had a high specific resistance (200 to 300 ohm-cm) in comparison with that of the isopropyl-isoquinolinium TCNQ complex salt (less than several tens of ohm-cm), and this caused a high dielectric loss and equivalent series resistance.

The solid-electrolyte capacitor prepared in Comparative Example 2 had a low dielectric loss and equivalent series resistance since the specific resistance of the TCNQ complex salt was lower than that of the electrolyte used in Comparative Example 1. However, the sample of Comparative Example 2 had a very low electrostatic capacitance. Although the exact reason for this phenomenon is not completely clear, a probable explanation would be as follow: the molten TCNQ complex salt penetrated to the deepest etch pits in the anode surface, but during the subsequent cooling, the complex salt formed acicular crystals which made point contact with the dielectric oxide film within the pits.

On the other hand, the solid-electrolyte capacitor samples prepared in Examples 1 to 13 in accordance with the present invention had sufficiently large amounts of the TCNQ complex salt deposited on the dielectric oxide film to exhibit high static capacitance values. This is probably because the solid electrolyte made of a mixture of isopropyl-isoquinolinium TCNQ complex salt and lactone compound prevented the crystallization of the complex salt during the cooling that followed the impregnation of the anode surface with the molten mixture, and the amorphous complex salt left in in the etched pits ensured adequate contact with the dielectric oxide film on the anode surface.

Figure 4:
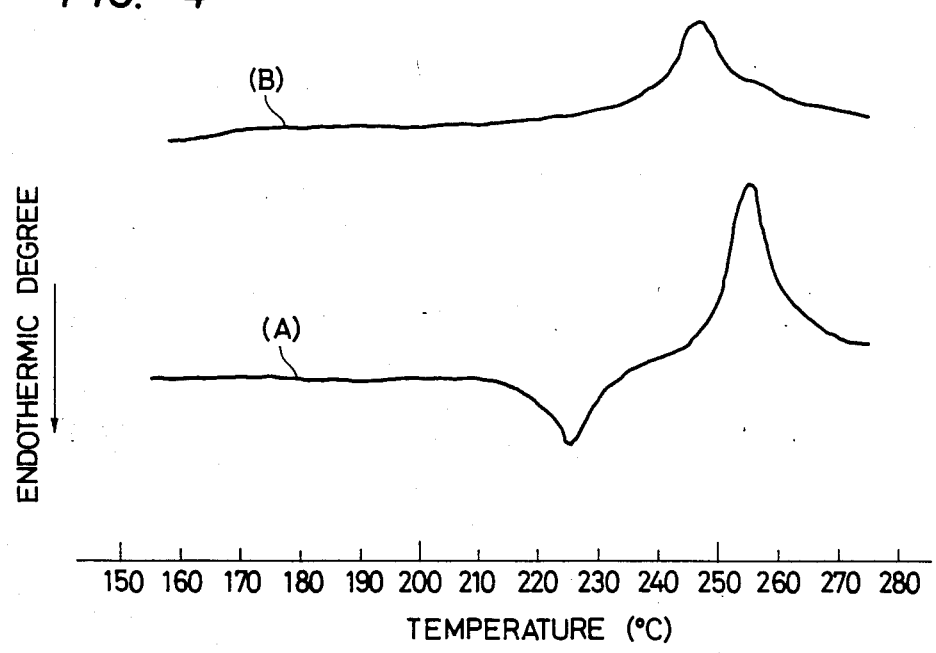
FIG. 4 is a DTA chart for a TCNQ complex salt alone and a mixture thereof with γ-butyrolactone which were both solidified by cooling molten samples.

In order to verify this assumption, a differential thermal analysis (DTA) was conducted with two samples of molten and cooled electrolyte, and the results are shown in FIG. 4, wherein curve (A) refers to the solidified sample of electrolyte used in Comparative Example 2 which was made of only isopropyl-isoquinolinium TCNQ complex salt, and curve (B) refers to the solidified sample of the electrolyte used in Example 1 that was made of a mixture of the isopropyl-isoquinolinium TCNQ complex salt and γ-butyrolactone. The curve (B) has an endothermic peak, suggesting the amorphous state of the mixture used in Example 1. Both curves had an exothermic peak at about 250° C. indicating the decomposition point of the TCNQ complex salt. Although not shown here, data for mixtures with other lactone compounds was similar to curve (B).

According to the present invention, a mixture of isopropyl-isoquinolinium TCNQ complex salt and a lactone compound has a glass transition point and melts at a temperature lower than the proper melting point of the TCNQ complex salt. This is effective in prolonging the time before pyrolysis of the mixture occurs and facilitates the impregnation of the electrolyte in the anode surface. Stated more specifically, pure isopropyl-isoquinolinium TCNQ complex salt has a melting point of 240° C. or more, at which temperature the complex salt decomposes within about 2 minutes. Since the impregnation and cooling of the electrolyte must be completed within this short period, using the pure salt, no more than two cycles of such steps can be repeated and the remaining TCNQ complex salt has to be discarded because it has already lost its conductivity. According to the present invention, however, the mixture of isopropyl-isoquinolinium TCNQ complex salt with a lactone compound melts at a temperature below 200° C. with the number of degrees below 200° C. at which the glass transition point varies with the type and mixing ratio of the specific lactone compound. Since the time before pyrolysis is extended, many cycles of the impregnation and cooling steps can be repeated without wasting the expensive TCNQ complex salt.

The capacitor elements used in Examples 1 to 13 were prepared by rolling an aluminum foil anode having a dielectric oxide film on the etched surface, and a collector electrode with a separator paper inserted between the two strips. The capacitor element that can be used in the present invention is not limited to this particular configuration, and the anode may be made of tantalum, other film-forming metals, or alloys of such metals. The anode may be made by pressing a compact of a film-forming metal powder and sintering to fuse the particles to form a porous structure. Also available are foil-type capacitors wherein no separator paper is present between the anode and collector electrode. Also, the collector electrode can be made of a non-aluminum metal or a heat-resistant electroconductive resin film.

A metal case was used in the above Examples, but it should be understood that the capacitor element may be encased in a resin container, a dipped or molded plastic container, or encapsulated in a laminated film.

Lactone compounds other than those specifically used in the Examples are also effective in achieving the objects of the present invention. In the Examples, lactone compounds were used singly, but similar results will be obtained by combining two or more lactone compounds.

As will be understood from the foregoing, the present invention enables the fabrication of a solid-electrolyte capacitor having a high impregnation ratio of solid electrolyte or high static capacity per unit volume, therefore permitting the optimum in miniaturization. Since only one impregnation cycle is sufficient to provide the necessary characteristics for the capacitor, the process of electrolyte layer formation is simplified. The possibility of using lower temperatures for melting the TCNQ complex salt ensures a sufficiently long lead time to pyrolysis of the electrolyte not only to simplify the impregnation process but also to its maximize efficiency. As a further advantage, the TCNQ complex salt is in uniform contact with the dielectric oxide film so that a solid-electrolyte capacitor having a low loss and low impedance characteristics at high frequency can be produced by a simple apparatus. The process of the present invention also achieves a maximum reduction in the waste of the expensive TCNQ complex salt. For these reasons, the present invention enables the fabrication of a solid-electrolyte capacitor with improved characteristics with utmost efficiency.

We claim:

1. An organic semiconductor electrolyte capacitor comprising: a metal anode having a dielectric oxide film formed on a surface thereof and an electrolyte layer formed on said dielectric oxide film, a collector electrode, and a separator positioned between said anode and collector electrode, said electrolyte layer being formed by melting and solidifying a mixture of isopropyl-isoquinolinium tetracyanoquinodimethane complex salt and lactone compound.

2. An organic semiconductor electrolyte capacitor according to claim 1, wherein said lactone compound is at least one member of the group consisting of γ-butyrolactone, γ-valerolactone, δ-valerolactone, ε-caprolactone, γ-heptalactone, δ-nonalactone, DL-pantyllactone, γ-hexalactone, γ-octalactone, γ-nonalactone, γ-decalactone, γ-undecalactone and γ-dodecalactone.

* * * * *